(12) United States Patent  
Sawamoto

(10) Patent No.: US 7,966,129 B2  
(45) Date of Patent: Jun. 21, 2011

(54) VEHICULAR CONTROL OBJECT DETERMINATION SYSTEM

(75) Inventor: Kiichiro Sawamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 870 days.

(21) Appl. No.: 11/253,768

(22) Filed: Oct. 18, 2005

(65) Prior Publication Data

US 2006/0089801 A1   Apr. 27, 2006

(30) Foreign Application Priority Data

Oct. 20, 2004   (JP) .................................. 2004-306013

(51) Int. Cl.  
*G06F 17/10* (2006.01)

(52) U.S. Cl. ............ 701/301; 701/93; 701/96; 701/300; 180/167; 180/170; 340/435; 340/436

(58) Field of Classification Search ................. 701/301, 701/1, 36, 41, 93; 340/901, 903, 905  
See application file for complete search history.

(56) References Cited

U.S. PATENT DOCUMENTS

| | | | | |
|---|---|---|---|---|
| 6,021,375 | A * | 2/2000 | Urai et al. .................... | 701/301 |
| 6,269,307 | B1 * | 7/2001 | Shinmura et al. ............. | 701/301 |
| 6,653,935 | B1 * | 11/2003 | Winner et al. ................. | 340/435 |
| 2003/0234127 | A1 * | 12/2003 | Sudou et al. .................. | 180/170 |
| 2005/0216137 | A1 * | 9/2005 | Schroder ......................... | 701/1 |

FOREIGN PATENT DOCUMENTS

| | | |
|---|---|---|
| JP | 05-069757 | 3/1993 |
| JP | 06-149374 | 5/1994 |
| JP | 09-091598 | 4/1997 |
| JP | 3183501 | 3/1998 |
| JP | 10-172098 | 6/1998 |
| JP | 2000-057498 | 2/2000 |
| JP | 2000-343980 | 12/2000 |

* cited by examiner

*Primary Examiner* — Mark Hellner  
*Assistant Examiner* — Redhwan Mawari  
(74) *Attorney, Agent, or Firm* — O'Melveny & Myers LLP

(57) ABSTRACT

A vehicular control object determination system includes: a radar device for detecting an object that is present in the direction of travel of a vehicle; a travel locus estimator for estimating a future travel locus of the vehicle; a control object determiner for determining a control object based on a detection result obtained by the radar device, a future travel locus of the vehicle estimated by the travel locus estimator based on a vehicle speed and a yaw rate and predetermined control object determination conditions; and a swing rate detector for detecting a swing rate of side-to-side swing of the estimated travel locus. When the detected swing rate is equal to or greater than a threshold value, the control object determiner excludes from determination of a control object an object that is further than a predetermined distance. Therefore, when the swing rate is large and the estimation accuracy is lowered, an object that is farther than a predetermined distance is excluded from determination of a control object, thereby avoiding erroneous determination of a control object.

3 Claims, 8 Drawing Sheets

VEHICULAR CONTROL OBJECT DETERMINATION SYSTEM

RELATED APPLICATION DATA

The present application claims priority to Japanese priority application No. 2004-306013, filed Oct. 20, 2004, which is hereby incorporated in its entirety herein by reference.

BACKGROUND OF THE INVENTION

1. Field of the Invention

The present invention relates to a vehicular control object determination system that includes an object detector for detecting an object that is present in the direction of travel of a vehicle, travel locus estimator for estimating a future travel locus of the vehicle, and control object determiner for determining a control object based on a detection result obtained by the object detector, a travel locus estimated by the travel locus estimator, and predetermined control object determination conditions.

2. Description of Related Art

Japanese Patent Publication No. 3183501 discloses a vehicular travel control system in which a future travel locus of a subject vehicle is estimated, and when tracking control is carried out by employing a preceding vehicle present on the travel locus as a control object, if it is detected that the subject vehicle changes lanes, the travel locus is shifted parallel by an amount corresponding to the width of the lane so as to set a new travel locus, and tracking control is carried out by employing a preceding vehicle present on the new travel locus as a control object. The Publication also discloses a vehicular travel control system in which, when it is detected that a subject vehicle changes lanes, tracking control is stopped or temporarily suspended, and when a driver thereafter operates a switch, tracking control is carried out by employing as a control object a new preceding vehicle on a travel locus of the subject vehicle.

In the above-mentioned former vehicular travel control system, the travel locus that has been estimated before changing lanes is shifted parallel to give a travel locus after changing lanes, but the actual travel locus after changing lanes does not always coincide with that obtained by shifting parallel the travel locus estimated before changing lanes and, in particular, there is a possibility that an erroneous determination might occur when determining whether or not a preceding vehicle that is far away from the subject vehicle is a control object. Further, in the above-mentioned latter vehicular travel control system, when the subject vehicle changes lanes, tracking control is stopped or temporarily suspended and the tracking control is not resumed until the driver operates a switch, resulting in a deterioration of convenience.

SUMMARY OF THE INVENTION

The present invention has been accomplished under the above-mentioned circumstances, and it is an object thereof to prevent erroneous determination of a control object even when the reliability of a future travel locus of the subject vehicle is degraded.

In order to achieve the above-mentioned object, according to a first feature of the invention, there is provided a vehicular control object determination system comprising: an object detector for detecting an object that is present in the direction of travel of a vehicle; a travel locus estimator for estimating a future travel locus of the vehicle; a control object determiner for determining a control object based on a detection result obtained by the object detector, a travel locus estimated by the travel locus estimator, and predetermined control object determination conditions; and a swing rate detector for detecting a swing rate of side-to-side swing of the travel locus estimated by the travel locus estimator; the control object determiner modifying the control object determination conditions based on the detected swing rate.

With the first feature of the present invention, when the control object determiner determines a control object based on the detection result of the object detector detecting an object that is present in the direction of travel of the vehicle, the future travel locus of the subject vehicle estimated by the travel locus estimator, and the predetermined control object determination conditions, the swing rate detector detects the swing rate of side-to-side swing of the estimated travel locus, the control object determiner modifies the control object determination conditions based on the swing rate. Therefore, it is possible to set appropriate control object determination conditions according to a change in the accuracy with which the travel locus is estimated, which changes according to the size of the swing rate, thereby enabling a control object to be appropriately determined.

According to a second feature of the present invention, in addition to the first feature, the system further comprises a comparator for comparing the detected swing rate with a predetermined threshold value; and when the detected swing rate is equal to or greater than the threshold value, the control object determiner excludes from determination of a control object an object that is further than a predetermined distance.

With the second feature of the present invention, the comparator compares the swing rate with the predetermined threshold value, and if the swing rate is equal to or greater than the threshold value, the control object determiner excludes from determination of the control object an object that is further than the predetermined distance. That is, when the swing rate is large and the accuracy with which the travel locus is estimated is degraded, it is possible to avoid erroneous determination of the control object by excluding a distant object from determination of the control object.

According to a third feature of the present invention, in addition to the first feature, the system further comprises a comparator for comparing the detected swing rate with a predetermined threshold value; and when the detected swing rate is equal to or greater than the threshold value, the control object determiner delays the timing of determining as a control object an object that is further than a predetermined distance.

With the third feature of the present invention, the comparator compares the swing rate with the predetermined threshold value, and if the swing rate is equal to or greater than the threshold value, the control object determiner delays the timing of determining as the control object an object that is further than the predetermined distance. That is, when the swing rate is large and the accuracy with which the travel locus is estimated is degraded, it is possible to determine as the control object an object that is as distant as possible without degrading the determination accuracy, by eliminating any influence from momentary swings of the travel locus or noise.

According to a fourth feature of the present invention, in addition to any of the first to third features, the comparator increases the threshold value according to an increase in the distance from a subject vehicle.

With the fourth feature of the present invention, the comparator increases the threshold value for the swing rate according to an increase in the distance from the subject vehicle. That is, setting a larger threshold value for a more distant object for which the detection accuracy tends to be degraded can more reliably prevent erroneous determination of a control object.

According to a fifth feature of the present invention, in addition to any of the first to fourth features, the system further comprises a vehicle speed sensor for detecting a vehicle speed and a yaw rate sensor for detecting a yaw rate; and the travel locus estimator estimates a future travel locus of the vehicle based on a vehicle speed detected by the vehicle speed sensor and a yaw rate detected by the yaw rate sensor.

With the fifth feature of the present invention, since the travel locus estimator estimates the future travel locus of the vehicle based on the vehicle speed detected by the vehicle speed sensor and the yaw rate detected by the yaw rate sensor, it is possible to estimate the travel locus with good accuracy.

According to a sixth feature of the invention, there is provided a vehicular control object determination system comprising: an object detector for detecting an object that is present in the direction of travel of a vehicle; a travel locus estimator for estimating a future travel locus of the vehicle; a control object determiner for determining a control object based on a detection result obtained by the object detector, a travel locus estimated by the travel locus estimator, and predetermined control object determination conditions; and a lane change detector for detecting whether or not a subject vehicle makes a travel lane change; the control object determiner modifying the control object determination conditions when a travel lane change of the subject vehicle is detected.

With the sixth feature of the present invention, when the control object determiner determines a control object based on the detection result of the object detector detecting an object that is present in the direction of travel of the vehicle, the future travel locus of the subject vehicle estimated by the travel locus estimator, and the predetermined control object determination conditions, if the lane change detector detects that the subject vehicle makes a travel lane change, the control object determiner modifies the control object determination conditions. Therefore, it is possible to compensate for a degradation, due to the lane change, in the accuracy with which the future travel locus of the subject vehicle is estimated, thereby appropriately determining a control object.

According to a seventh feature of the present invention, in addition to the sixth feature, when a lane change of the subject vehicle is detected, the control object determiner excludes from determination of a control object an object that is further than a predetermined distance.

With the seventh feature of the present invention, when the lane change detector detects a lane change of the subject vehicle, the control object determiner excludes from determination of the control object an object that is further than the predetermined distance. Therefore, it is possible to compensate for a degradation, due to the lane change, in the accuracy with which the control object is determined, thereby avoiding erroneous determination of a control object.

According to an eighth feature of the present invention, in addition to the sixth feature, when a lane change of the subject vehicle is detected, the control object determiner delays the timing of determining as a control object an object that is further than a predetermined distance.

With the eighth feature of the present invention, when the lane change detector detects a lane change of the subject vehicle, the control object determiner delays the timing of determining as the control object an object that is further than the predetermined distance. Therefore, even when the accuracy with which the future travel locus of the subject vehicle is estimated is degraded due to the lane change, it is possible to determine as the control object an object that is as distant as possible, without degrading the accuracy of determination of the control object.

According to a ninth feature of the present invention, in addition to any of the sixth to eighth features, the system further comprises a vehicle speed sensor for detecting a vehicle speed, a yaw rate sensor for detecting a yaw rate, and a direction indicator operated by a driver, and the travel locus estimator estimates a future travel locus of the vehicle based on a vehicle speed detected by the vehicle speed sensor and a yaw rate detected by the yaw rate sensor, and the lane change detector detects a lane change of the subject vehicle based on the estimated travel locus and a signal from the direction indicator.

With the ninth feature of the present invention, since the future travel locus of the vehicle is estimated based on the vehicle speed detected by the vehicle speed sensor and the yaw rate detected by the yaw rate sensor, the travel locus can be estimated with good accuracy. Moreover, since the lane change detector detects a lane change of the subject vehicle based on the estimated travel locus and the signal from the direction indicator, the lane change can be reliably detected.

A radar device of an embodiment corresponds to the object detector of the present invention.

The above-mentioned object, other objects, characteristics, and advantages of the present invention will become apparent from an explanation of preferred embodiments that will be described in detail below by reference to the attached drawings.

BRIEF DESCRIPTION OF THE DRAWINGS

FIG. 1 is a block diagram of a control system for an ACC system;

FIG. 2 is a flowchart for explaining the operation;

FIG. 3 is a diagram for explaining a method for estimating a future travel locus of a subject vehicle;

FIG. 4 is a diagram for explaining the operation when the future travel locus of the subject vehicle is unstable; and FIG. 5 is a diagram for explaining the definition of the swing rate of the travel locus.

FIG. 6 is a block diagram of a control system for an ACC system;

FIG. 7 is a flowchart for explaining the operation; and

FIG. 8 is a diagram for explaining the operation when a subject vehicle makes a lane change.

DETAILED DESCRIPTION OF THE PREFERRED EMBODIMENT

Figure 1:
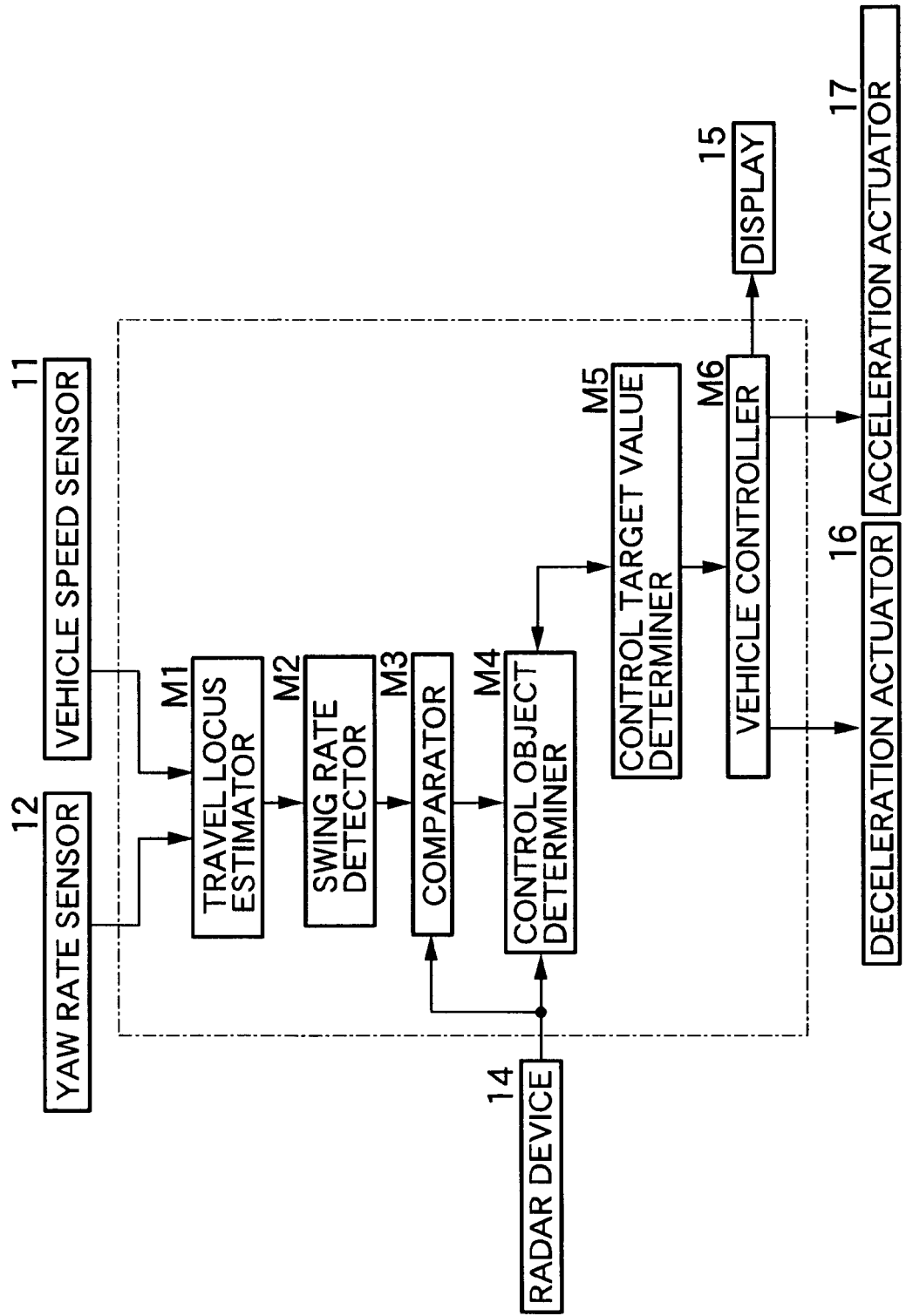
FIG. 1 to FIG. 5 show a first embodiment of the present invention.

As shown in FIG. 1, an ACC (Adaptive Cruise Control) system which maintains a preset inter-vehicle distance when there is a preceding vehicle, thus tracking the preceding vehicle, and maintains a preset vehicle speed when there is no preceding vehicle, thus keeping the speed constant. The ACC system includes: travel locus estimator M1; swing rate detector M2; comparator M3; control object determiner M4; control target value determiner M5; and vehicle controller M6.

Connected to the travel locus estimator M1 are a vehicle speed sensor 11 and a yaw rate sensor 12. Connected to the comparator M3 and the control object determiner M4 is a radar device 14. Connected to the vehicle controller M6 are a display 15, a deceleration actuator 16, and an acceleration actuator 17.

Figure 3:
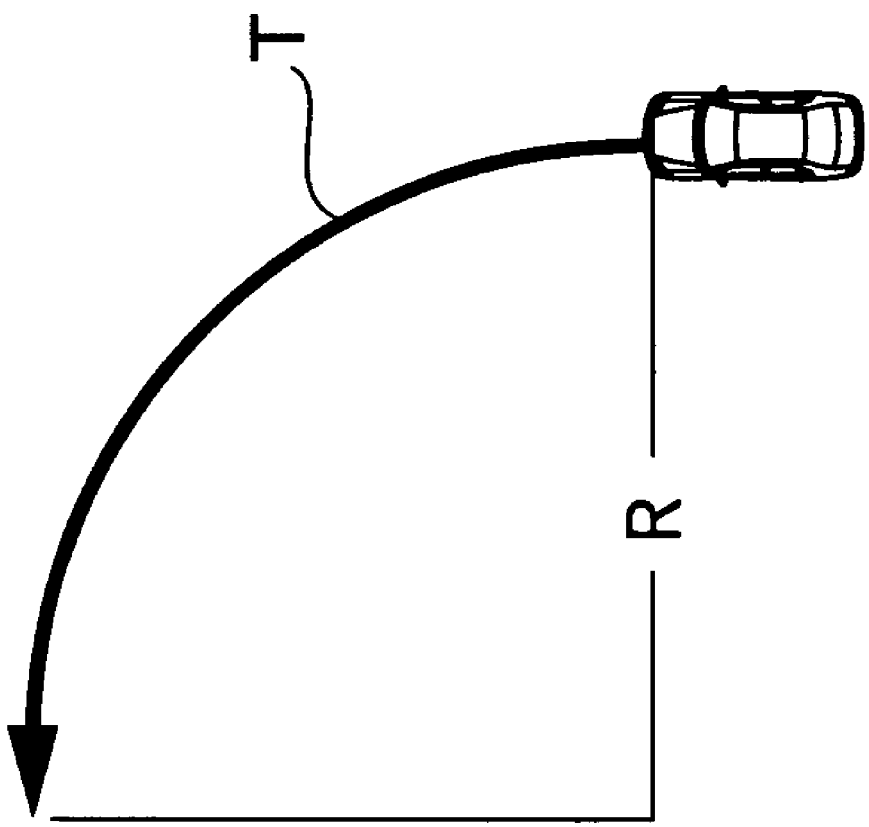

As shown in FIG. 3, the travel locus estimator M1 estimates a future travel locus T of a subject vehicle based on a vehicle speed detected by the vehicle speed sensor 11 and a yaw rate detected by the yaw rate sensor 12. That is, since a turning radius R of the vehicle can be calculated from a present vehicle speed and yaw rate, the future travel locus T of the subject vehicle can be estimated by joining an arc having the turning radius R to a present direction of travel of the subject vehicle. Estimation of the travel locus T is carried out at predetermined time intervals Δt.

Figure 5:
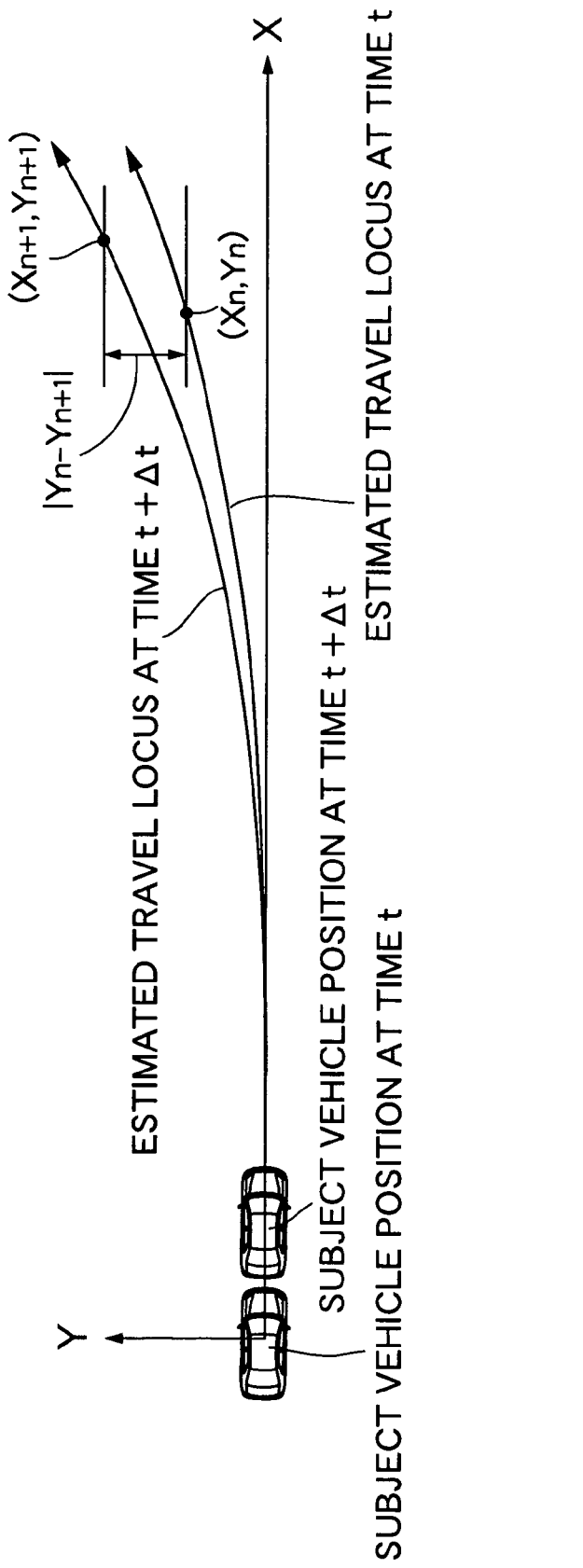

The swing rate detector M2 compares the previously estimated travel locus and the currently estimated travel locus, and detects a swing rate of the travel locus from a difference between the two. That is, as shown in FIG. 5, the estimated travel locus is superimposed on an X-Y coordinate system fixed to the subject vehicle at time t, and a previous value Yn of a sideways displacement, which is the Y coordinate when the X coordinate along the longitudinal direction of the vehicle body is a predetermined value Xn (e.g. 100 m), is calculated. A travel locus estimated again at time t+Δt, which is the predetermined time M later than the time t, is superimposed on the X-Y coordinate system, and a current value $Y_{n+1}$ of the sideways displacement, which is the Y coordinate when the X coordinate is a predetermined value Xn+1 (e.g. 100 m), is calculated. The swing rate detector M2 calculates the absolute value $[Y_n-Y_{n+1}]$, which is the deviation of the sideways displacement. The absolute value $[Y_n-Y_{n+1}]$ of the deviation of the sideways displacement is the amount of swing of the travel locus in the sideways direction in the predetermined time Δt, and corresponds to the swing rate of the travel locus.

The comparison means M3 compares the absolute value $[Y_n-Y_{n+1}]$ of the deviation of the sideways displacement calculated by the swing rate detector M2 with a prestored threshold value. When $[Y_n-Y_{n+1}] \geq$ the threshold value is satisfied, the control object determiner M4 modifies criteria for determining as a control object a preceding vehicle detected by the radar device 14. That is, the control object determiner M4 determines as a preceding vehicle an object that is detected on the estimated travel locus, but when $[Y_n-Y_{n+1}] \geq$ the threshold value is not satisfied, a preceding vehicle that is present up to, for example, 100 m ahead is determined as the control object, and when $[Y_n-Y_{n+1}] \geq$ the threshold value is satisfied, a preceding vehicle that is present up to, for example, 70 m ahead, which is shorter than 100 m, is determined as the control object.

When $[Y_n-Y_{n+1}] \geq$ the threshold value is satisfied, determination of whether or not a preceding vehicle is the control object may not be immediately carried out but may be carried out with a predetermined time delay. By so doing, it is possible to prevent the determination distance from being unnecessarily shortened due to the influence of a momentary swing in the travel locus or noise, thereby determining as the control object a preceding vehicle that is as distant as possible without degrading the determination accuracy.

Figure 4:
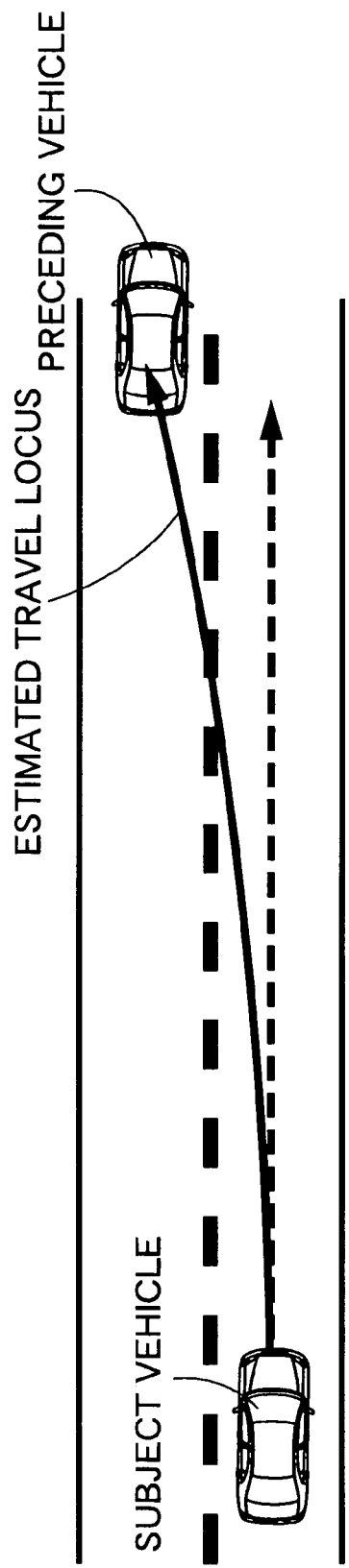

In this way, since the error in the estimated future travel locus of the subject vehicle increases with the increase of the distant from the subject vehicle, when the travel locus is unstable (that is, when the swing rate is large), it is difficult to carry out determination of whether or not a distant preceding vehicle is the control object with good accuracy. Therefore, as shown in FIG. 4, there is a possibility that a preceding vehicle that should be the control object is erroneously determined as not being the control object, or a possibility that a preceding vehicle that should not be a control object is erroneously determined as being the control object. However, even when the travel locus is unstable, by reducing the maximum distance for which it is determined whether or not a preceding vehicle is the control object, erroneous determination of the control object can be avoided.

The control target value determiner M5 determines a target vehicle speed, a target acceleration/deceleration, a target inter-vehicle distance, etc., which are parameters used for making the subject vehicle track the preceding vehicle that is the control object. The vehicle controller M6 operates the deceleration actuator 16 and the acceleration actuator 17 based on a control target value determined by the control target value determiner M5 so as to open and close a throttle valve or operate a brake system, thus carrying out tracking control and constant speed travel control, and displays a present control state of the vehicle on the display 15 so as to inform a driver thereof.

Figure 2:
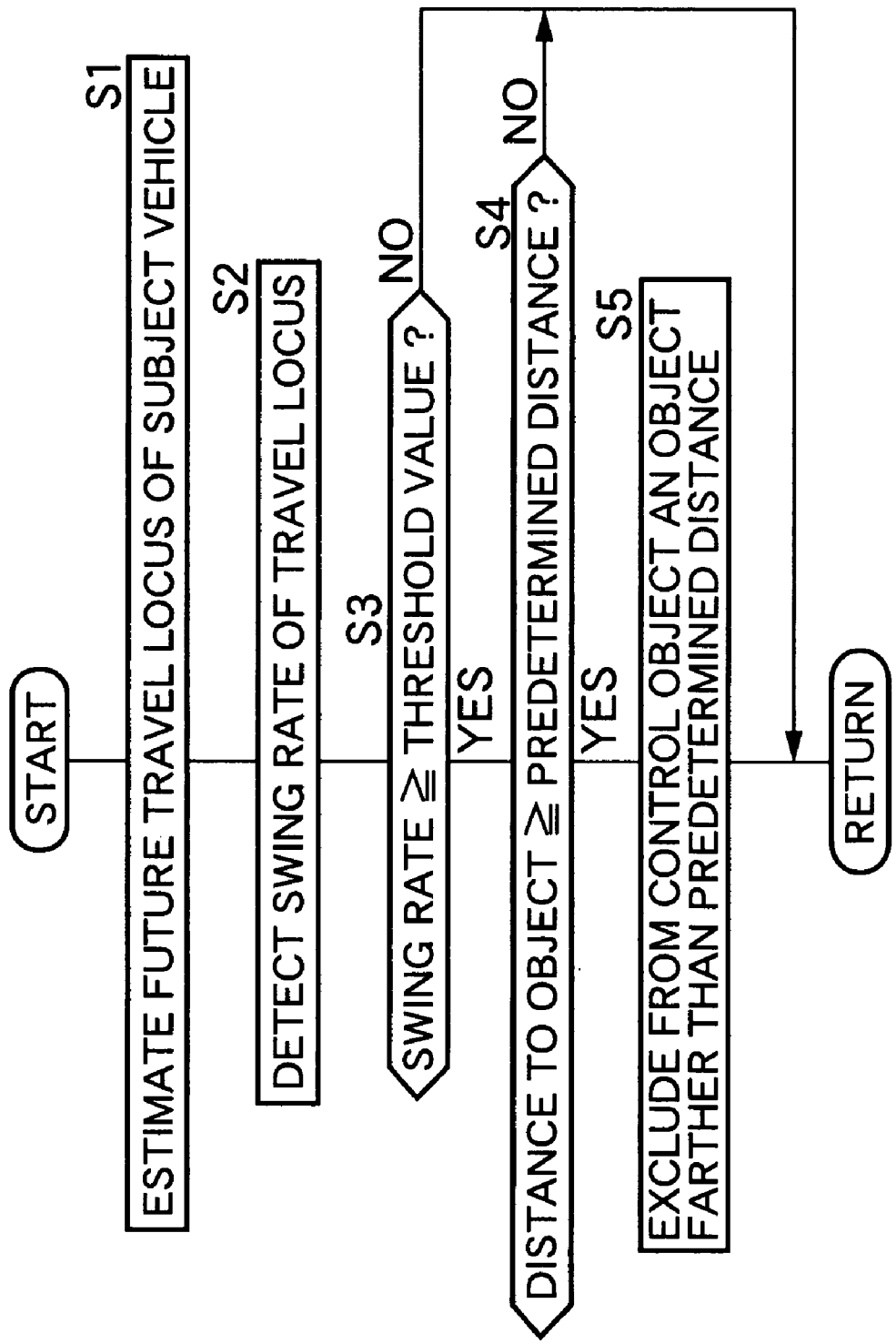

Operation of the above is now further explained by reference to the flowchart of FIG. 2.

Firstly in step S1 the travel locus estimator M1 estimates the future travel locus of the subject vehicle based on the yaw rate and the vehicle speed. In the subsequent step S2, the swing rate detector M2 detects the swing rate of the future travel locus, and in step S3 the comparator M3 compares the swing rate with the threshold value. If the swing rate is equal to or greater than the threshold value and the distance to the object detected in step S4 is equal to or greater than the predetermined distance, then in step S5 the object which is more distant than the predetermined distance is excluded from determination of whether or not it is the control object. In other words, the maximum distance for which it is determined whether or not a detected object is the control object is shortened to the predetermined distance.

Figure 6:
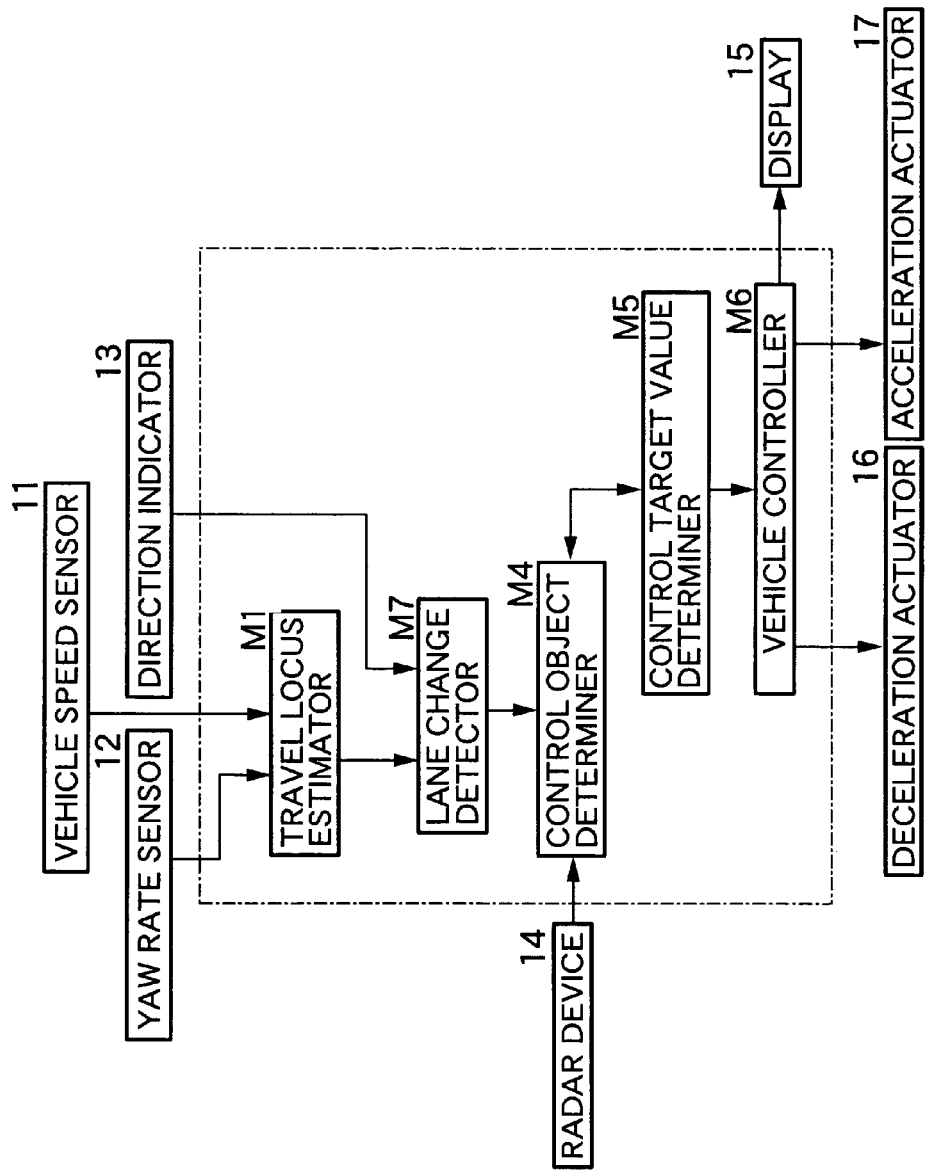
FIG. 6 to FIG. 8 show a second embodiment of the present invention.
Figure 7:
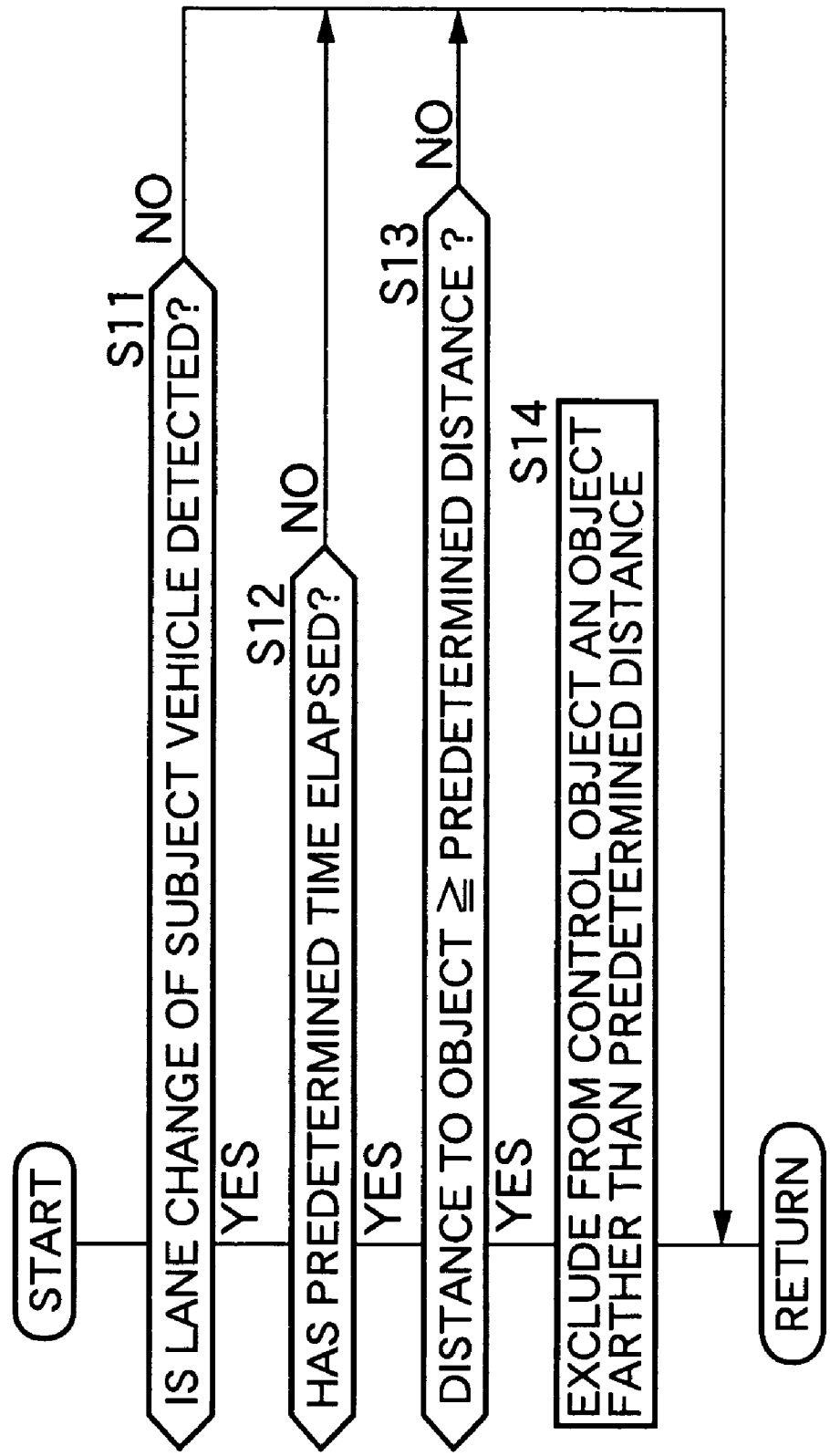
Figure 8:
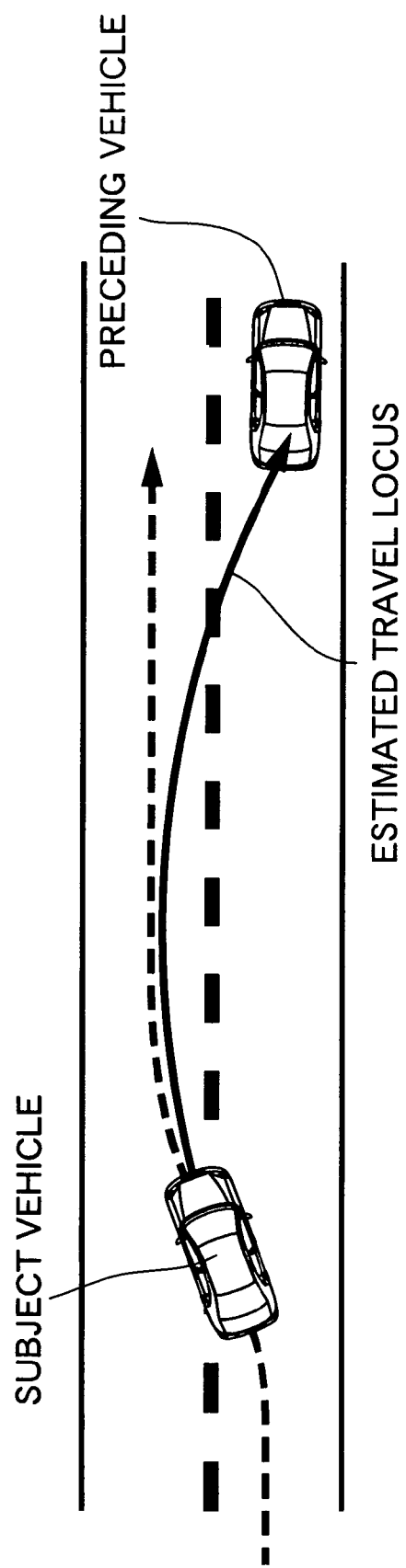

FIG. 6 to FIG. 8 show a second embodiment of the present invention.

The second embodiment shown in FIG. 6 includes lane change detector M7 instead of the swing rate detector M2 and the comparator M3 of the first embodiment. Inputted into the lane change detector M7 are a travel locus estimated by travel locus estimator M1 and a signal from a direction indicator 13 which is operated by a driver.

As shown in FIG. 8, for example, when a subject vehicle tracking a preceding vehicle in the right-hand lane changes to the left-hand lane, the steering wheel is first turned to the left and then turned back to the right; and due to the rightward yaw rate generated when the steering wheel is turned to the right, the estimated future travel locus is directed to the right-hand lane. As a result, although the subject vehicle is traveling in the left-hand lane after the lane change, there is a possibility that a preceding vehicle in the right-hand lane might be misidentified as a control object.

The lane change detector M7 therefore detects a lane change of the subject vehicle based on a travel locus estimated by the travel locus estimator M1 and a direction of travel indicated by the direction indicator 13. When a lane change of the subject vehicle is detected, in the same manner as in the first embodiment, control object determiner M4, which usually determines a preceding vehicle up to, for example, 100 m ahead as the control object, reduces the maximum determination distance and determines as the control object a preceding vehicle up to, for example, 70 m ahead, which is shorter than 100 m. By so doing, even if the accuracy with which the future travel locus of the subject vehicle is estimated is degraded due to a lane change, the influence thereof can be minimized, and erroneous determination of the control object can be avoided.

During this process, determination of whether or not a preceding vehicle is the control object may not be immediately carried out but may be carried out with a predetermined time delay. By so doing, it is possible to prevent the determination distance from being unnecessarily shortened due to a momentary swing in the travel locus or noise, thereby determining as the control object a preceding vehicle that is as distant as possible without degrading the determination accuracy.

Furthermore, since a lane change is detected using a change in the estimated travel locus and an operation signal of the direction indicator 13, the lane change can be reliably detected.

The above-mentioned operation is further explained by reference to the flowchart of FIG. 7.

Firstly in step S11, when the lane change detector M7 detects a lane change of the subject vehicle, if in step S12 a predetermined time has elapsed and in step S13 the distance to the detected object is equal to or greater than the predetermined distance, then in step S14 an object that is more distant than the predetermined distance is excluded from determination of whether or not it is the control object. In other words, the maximum distance for which it is determined whether or not a detected object is the control object is reduced to the predetermined distance.

Although embodiments of the present invention have been described above, the present invention can be modified in a variety of ways without departing from the subject matter of the present invention.

For example, an ACC system has been described in the embodiments, but the present invention is not limited to the ACC system and is applicable to a vehicular travel locus estimation system or a vehicular control object determination system for any purpose.

Furthermore, in the first embodiment, whether or not to reduce the maximum distance for determining a preceding vehicle as the control object is determined based on the swing rate of the travel locus 100 m ahead of the subject vehicle, but if the above-mentioned determination is carried out based on swing rates of the travel locus at a plurality of distances ahead of the subject vehicle, the determination can be more accurately carried out. In this case, since the error of the estimated travel locus increases with the increase of the distant from the subject vehicle, it is necessary to accordingly increase the threshold value with which the absolute value $[Y_n-Y_{n+1}]$ of the deviation of the sideways displacement is compared.

What is claimed is:

1. A vehicular control object determination system comprising:
   an object detector for detecting a plurality of objects that are present in the direction of travel of a vehicle;
   a travel locus estimator for estimating a future travel locus of the vehicle at predetermined time intervals;
   a control object determiner for determining a control object from the plurality of objects based on a detection result obtained by the object detector, the future travel locus estimated by the travel locus estimator, and predetermined control object determination conditions; and
   a swing rate detector for detecting a swing rate of side-to-side swing of the future travel locus of the vehicle at a predetermined distance ahead of the vehicle based on at least the future travel locus estimated by the travel locus estimator;
   the control object determiner modifying the control object determination conditions based on the detected swing rate;
   wherein when the detected swing rate is equal to or greater than a predetermined threshold value, the control object determiner excludes from determination of the control object each one of said plurality of objects that is farther than a distance shorter than said predetermined distance.

2. The vehicular control object determination system according to claim 1, further comprising a comparator for comparing the detected swing rate with the predetermined threshold value, and wherein when the detected swing rate is equal to or greater than the threshold value, the control object determiner delays the timing of determining as the control object each one of the at least one object that is farther than said predetermined distance.

3. The vehicular control object determination system according to claim 2, wherein the comparator increases the threshold value according to an increase in the distance from a subject vehicle.

* * * * *